United States Patent [19]

Cooper

[11] Patent Number: 4,721,862

[45] Date of Patent: Jan. 26, 1988

[54] AUXILIARY FUSE BLOCK

[75] Inventor: Gershon N. Cooper, Encino, Calif.

[73] Assignee: Alliance Research Corporation, Chatsworth, Calif.

[21] Appl. No.: 24,963

[22] Filed: Mar. 12, 1987

[51] Int. Cl.[4] .............................................. H02B 1/18

[52] U.S. Cl. .................................. 307/10 R; 439/622; 337/191; 361/104; 361/430

[58] Field of Search ................ 339/134, 147 R, 198 J, 339/198 N; 337/186–191, 193, 200, 201, 207, 216; 174/59; 307/10 R; 361/349, 356–360, 407, 430, 104; 439/620, 621, 622, 709, 718, 723

[56] References Cited

U.S. PATENT DOCUMENTS

| | | | |
|---|---|---|---|
| 3,486,154 | 12/1969 | Seagrave | 337/187 |
| 3,828,290 | 8/1974 | Kawiecki | 337/190 |
| 4,072,401 | 2/1978 | Instone | 339/134 |
| 4,222,627 | 9/1980 | Cox | 339/147 R |
| 4,238,140 | 12/1980 | Cairns | 339/134 |
| 4,514,723 | 4/1985 | Leal | 361/349 |

*Primary Examiner*—G. P. Tolin
*Attorney, Agent, or Firm*—Marvin H. Kleinberg; Matthew F. Jodziewicz

[57] ABSTRACT

An auxiliary fuse block for use with an automotive electrical system having a battery and an integral fuse block including, in combination, a housing of electrically non-conductive material having disposed therein an electrically conducting bus bar and a plurality of recesses. Each of the recesses is adapted to releasably retain therein a fuse. Each of the fuses have a first end electrically connected to the bus bar and a second opposite end electrically connected to an electrically isolated binding post. The bus bar is directly electrically connected to the battery in parallel with the integral fuse block. The housing has at least one hole in it adapted to receive a fastener, as a bolt or a screw, for releasably attaching the housing to the car body. A transparent cover is provided to protect the fuses and permit their inspection while in the housing.

5 Claims, 6 Drawing Figures

AUXILIARY FUSE BLOCK

BACKGROUND OF THE INVENTION

1. Field of the Invention

This invention relates in general to electrical safety systems, and, more particularly, to an auxiliary fuse block for use in automotive electrical systems.

2. Description of the Related Art

The standard electrical system found in most all automobiles being marketed today provides the owner with a single, central fuse block that is directly connected to the car battery. All power from the car battery is distributed to the various electrical accessories and other electrically powered options that may be installed in the car.

Normally, in an attempt to stem rising expenses, no provision is made in either the central fuse block or in the electrical system to accommodate owner installed electrically powered optional equipment that is not specifically offered by the automotive manufacturer or for which no provision has been made in anticipation of a need.

Accordingly, when the car owner or an after-market installer attempts to add electrically powered accessory items to an automotive electrical system, they are forced to either draw power from an existing line which draws its power through the central fuse block or to run a connecting line preferably equipped with an in-line fuse directly to the battery's posts. In the former case, unanticipated current loads can easily occur on the modified line that can exceed the capacity of the fuse in the block and result in a "blown" fuse and the consequent loss or use of all equipment protected by that fuse. In the latter case, the car owner or after-market installer must be sufficiently aware of what he is doing to prevent installing a unfused and hence unprotected direct line to the car battery. Moreover, most automotive batteries are not designed to accommodate a plurality of individual power lines. In the first case inconvenience may result, in the second case, fire or a fatality may result.

It has become commonplace for a car purchaser to be the owner of an automobile having after-market modifications to the automotive electrical system caused by the acquisition and installation of such electrically powered systems as car audio equipment, mobile telephones, auxiliary lighting equipment and theft alarms. Likewise, the rise of serious accidents due to failed automotive electrical systems that have been modified by either the owner or an after-market installer has become a matter of concern.

SUMMARY OF THE INVENTION

It is an object of the present invention to provide an auxiliary fuse block for use with an automotive electrical system that will provide the installer of electrically powered accessory items with an easy, safe and economical way to connect such after-market options to the automotive electrical system.

It is another object of the present invention to provide an auxiliary fuse block for use with an automotive electrical system that will eliminate the practice of connecting many cables and wires directly onto the post or terminal of the automotive battery, which may cause damage to the car battery and to the car's electrical system.

It is yet another object of the present invention to provide an auxiliary fuse block for use in connecting automobile theft alarms, mobile telephones, trailers, fog lamps, road lamps, audio equipment and other automotive accessories that require electrical power to the automotive electrical system through protective fuses.

In general, an auxiliary fuse block for use with an automotive electrical system having a battery would comprise, in combination, a housing of electrically non-conductive material having disposed therein an electrically conducting bus bar and a plurality of recesses. Each of the recesses is adapted to releasably retain therein a fuse. Each of the fuses have a first end electrically connected to the bus bar and a second, opposite end electrically connected to an electrically isolated binding post. The bus bar is directly electrically connected to the battery by a wire of sufficient gauge to accommodate anticipated power needs. The housing has at least one hole in it adapted to receive a fastener, such as a bolt or a screw, for releasably attaching the housing to the car body.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENTS

Figure 1:
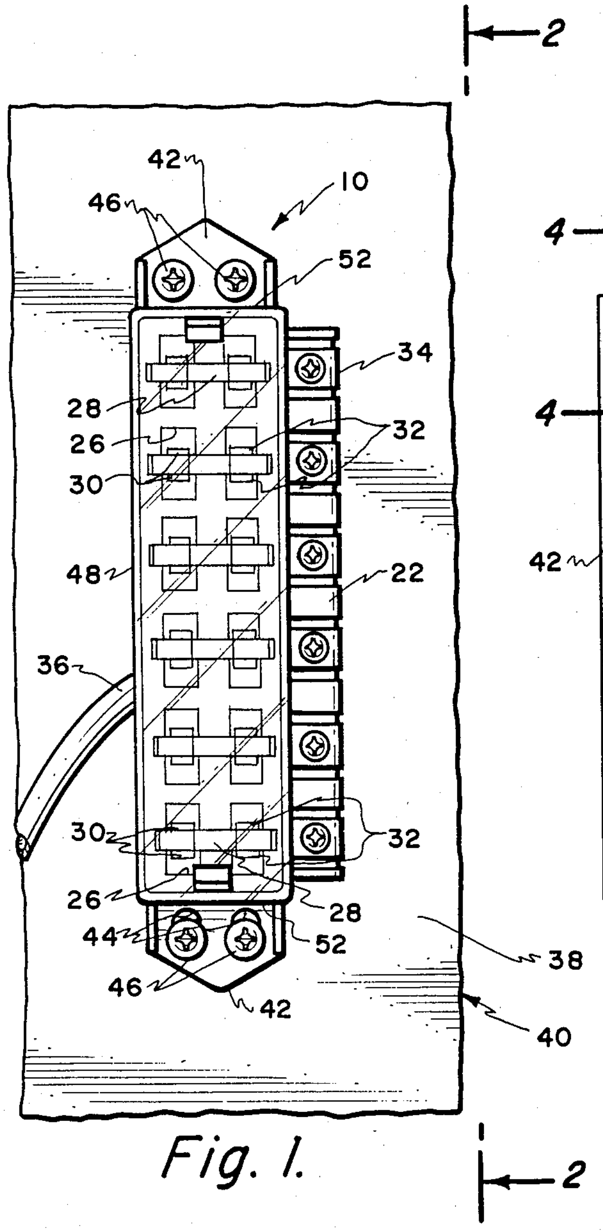
FIG. 1 is a top plan view of an auxiliary fuse block constructed in accordance with the invention herein.
Figure 2:
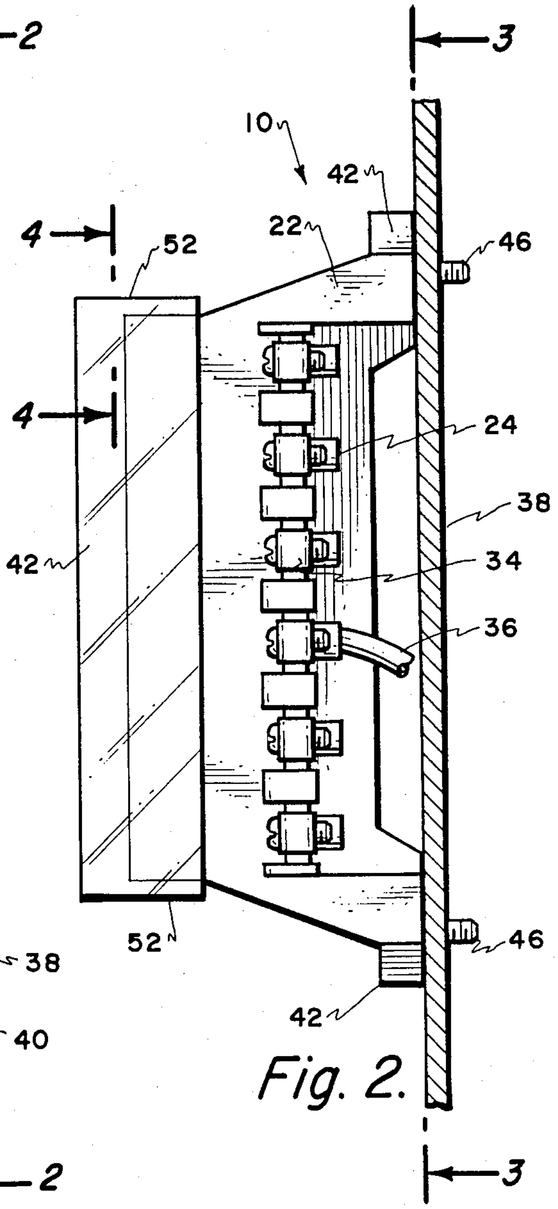
FIG. 2 is a side view of the fuse block of FIG. 1 taken along the line 2—2 in the direction of the appended arrows.
Figure 4:
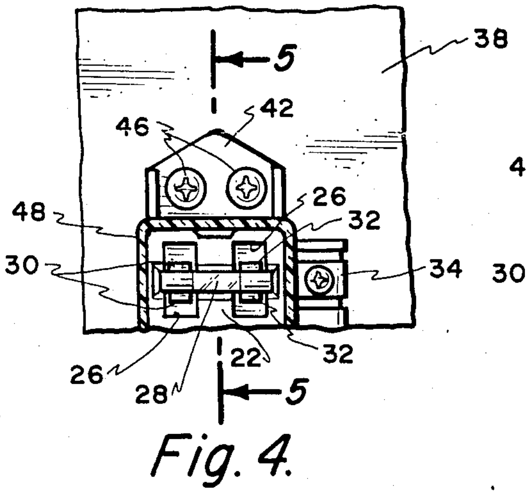
FIG. 4 is a sideview of the structure of FIG. 3 along the line 4—4 in the direction of the appended arrows.
Figure 5:
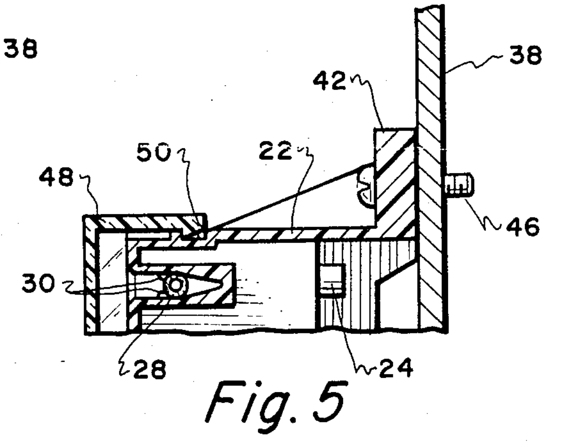
FIG. 5 is a side view of the fuse block of FIG. 4 taken along the line 5—5 in the direction of the appended arrows.
Figure 3:
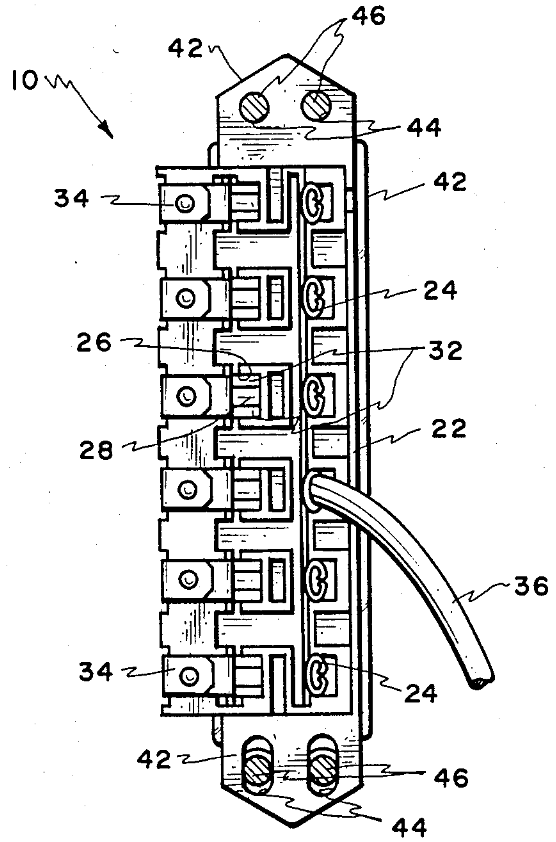
FIG. 3 is a bottom view of the fuse block of FIG. 2 taken along the line 3—3 in the direction of the appended arrows.
Figure 6:
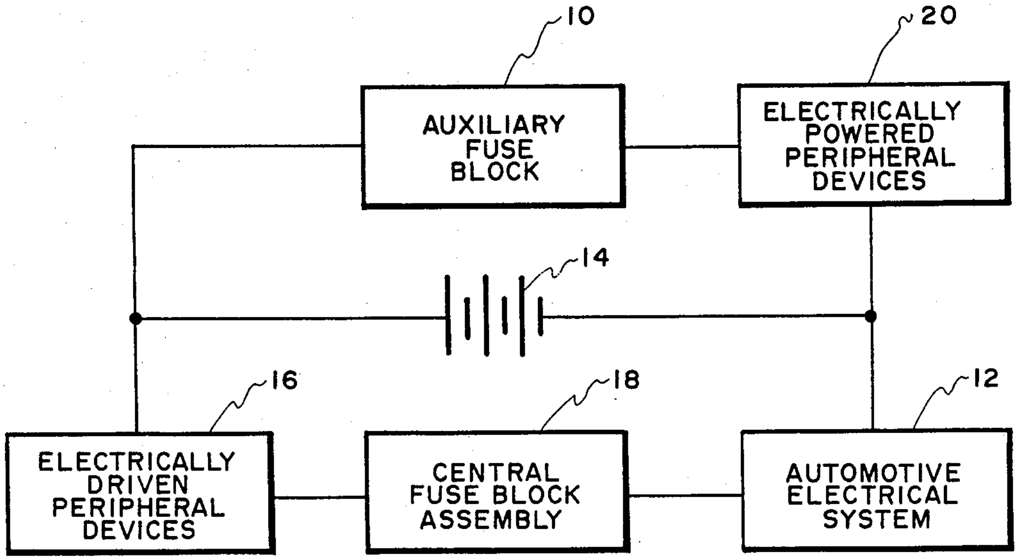
FIG. 6 is an overall system block diagram.

Referring to the drawings, especially FIGS. 1 and 2, a preferred embodiment of an auxiliary fuse block 10, constructed in accordance with the invention herein, is illustrated in overview. Auxiliary fuse block 10 is capable of being used in any type of electrical system, but, for the purposes of this description, shall be described in terms of its use in an automotive electrical system 12 as illustrated in FIG. 4 in block diagrammatic form.

Automotive electrical system 12 has a battery 14 as a source of electrical power for any electrically driven peripheral devices 16 connected to the system 12. As a safeguard to prevent an overload condition due to a malfunction of such peripheral devices 16, each of the devices 16 is electrically connected to system 12 through a central fuse block assembly 18 which is designed to be an integral part of the automotive electrical system.

Auxiliary fuse block 10 is electrically connected directly to battery 14 in parallel with the central fuse block assembly 18. Additional electrically powered peripheral devices 20 can now be electrically connected to the system 12 through auxiliary fuse block 10 as better described below.

Auxiliary fuse block 10 includes a housing 22 of electrically non-conductive material. Preferred types of such material for housing 22 are non-conducting plastics.

Disposed in housing 22 is an electrically conducting bus bar 24. Also disposed within housing 22 is a plurality of recesses 26. Each of the recesses 26 is adapted to releasably retain therein a fuse 28. The number of recesses 26 in housing 22 can vary to accommodate various requirements and types of fuses 28 intended to be held therein.

Each of the fuses 28 have a first end 30 electrically connected to the bus bar 24, and a second opposite end 32 electrically connected to an electrically isolated binding post 34. Each fuse is sized and rated to conduct a limited amount of current from the battery.

In alternative embodiments, more than one binding post 34 may be electrically connected to the system 12 through a single fuse 28 if so desired.

The bus bar 24 is electrically connected to the battery 14 by a wire 36 and through battery 14 to the system 12.

To provide housing 22 with means for being releasably attached to a foundation, such as a wall 38 of a car body 40, housing 22 has formed therein on its lower section 42 at least one hole 44 adapted to receive a fastener, such as a screw 46 or a bolt (not illustrated) therethrough, for engagement with the wall 38. In this manner an installer of the auxiliary fuse block 10 will be able to secure the auxiliary fuse block 10 to a solid foundation of his choosing to prevent damage to the fuse block 10 due to undesired movement.

In order to provide for additional safety to the fuses 28 disposed in recesses 26 in housing 22, a cover 48 is releasably attached to the housing 22 by snaps 50 formed in the sides 52 of cover 48 and housing 22. Once cover 48 is in place on housing 22, it will protect fuses 28 from inadvertent access and also prevent unwanted and possibly damaging items from entering recesses 26 when fuses 28 are absent.

The cover 48 is preferably formed from non-electrically conducting plastic material that is generally transparent. The material forming cover 48 is preferably transparent so as to permit inspection of the fuses 28 that are being retained in the recesses 26 in the housing 22 without removal of the cover 48 from engagement with the housing 22. With this arrangement, a user can inspect the fuses 28 quickly and safely without exposing himself to the danger of a shock.

In use, an individual will first position the auxiliary fuse block 10 with regard to both finding a solid and convenient foundation to secure the housing 22, but also with regard to the length of the wire 36 supplied, that is, wire 36 must make direct electrical connection to one of the posts of battery 14 or to the cable that ultimately powers the central fuse block assembly 18.

Once auxiliary fuse block 10 is both secured and electrically connected to the battery 14, the individual can now connect various electrically powered peripherial devices 20, such as car alarms, audio equipment, mobile telephones, and the like, to the binding posts 34.

Once devices 20 are connected to binding posts 34, the individual may choose a properly rated fuse 28 for insertion into the appropriate recess 26 in housing 22 to complete the electrical connection of the devices 20 to the automotive electrical system 12. In this manner, each of the devices 20 is both directly connected to battery 14 and individually fused through fuses 28 for safeguard against overload situations caused by a malfunction in the system 12 or the device 20. The auxiliary fuse block 10 will also prevent the melting or fire hazard that is caused by a malfunction such as a "short" in the electrical system or in an electrically power device that is connected to the electrical system, thus providing the owner of an automobile having after-market modifications with an additional amount of safety and security that is not otherwise found.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

What is claimed is:

1. An auxiliary fuse block located in an automotive electrical system having a battery and an integral fuse block, comprising, in combination:

a housing of electrically non-conductive material having disposed therein an electrically conducting bus bar and a plurality of recesses, each of said recesses releasably retaining therein a fuse, each of said fuses having a first end electrically connected to said bus bar and a second opposite end electrically connected to an electrically isolated binding post, and means coupling said bus bar to said battery in parallel with the integral fuse block;

said housing including means releasably attaching it to the automobile.

2. An auxiliary fuse block located in an automotive electrical system as in claim 1 wherein said housing is made of a plastic material.

3. An auxiliary fuse block located in an automotive electrical system as in claim 2 futher including, a cover, releasably attached to said housing for protecting said plurality of recesses in said housing from inadvertent access while said cover is attached to said housing.

4. An auxiliary fuse block located in an automotive electrical system as in claim 3 wherein said cover is formed from transparent plastic non-electrically conducting material adapted to permit inspection of said fuses retained in said recesses in said housing without removal of said cover from engagement with said housing.

5. An auxiliary fuse block located in an automotive electrical system as in claim 4 wherein said means releasably attaching said housing to said car body comprises at least one hole in said housing receiving a fastener therethrough to engage said car body.

* * * * *